United States Patent

Mentz et al.

Patent Number: 6,017,657
Date of Patent: Jan. 25, 2000

[54] METHOD FOR EMBOSSING HOLOGRAMS INTO ALUMINUM AND OTHER HARD SUBSTRATES

[75] Inventors: Brian R. Mentz, West Haven; Timothy F. Dolan, Trumbull, both of Conn.

[73] Assignee: Bridgestone Graphic Technologies, Inc., Bridgeport, Conn.

[21] Appl. No.: 08/978,916

[22] Filed: Nov. 26, 1997

[51] Int. Cl.[7] .................................................. G03H 1/18
[52] U.S. Cl. ................. 430/1; 430/2; 430/320; 430/321; 359/1; 359/2; 205/70; 205/79; 29/DIG. 37
[58] Field of Search ................... 430/320, 321, 430/1, 2; 205/70, 79; 29/DIG. 37; 359/1, 2, 3

[56] References Cited

U.S. PATENT DOCUMENTS

| | | | |
|---|---|---|---|
| 3,944,420 | 3/1976 | Gale et al. | 430/1 |
| 4,308,337 | 12/1981 | Roach et al. | 430/320 |
| 4,650,735 | 3/1987 | De Laat | 430/320 |
| 4,725,111 | 2/1988 | Weitzen et al. | 350/3.85 |
| 4,758,296 | 7/1988 | McGrew | 156/231 |
| 4,856,857 | 8/1989 | Takeuchi et al. | 360/3.6 |
| 4,925,260 | 5/1990 | Fisher et al. | 350/3.67 |
| 5,112,025 | 5/1992 | Nakayama et al. | 249/115 |
| 5,164,227 | 11/1992 | Miekka et al. | 427/162 |
| 5,193,014 | 3/1993 | Takenouchi et al. | 359/3 |
| 5,213,600 | 5/1993 | Greschner et al. | 65/102 |
| 5,266,409 | 11/1993 | Schmidt et al. | 428/446 |
| 5,478,650 | 12/1995 | Davanloo et al. | 428/408 |
| 5,521,030 | 5/1996 | McGrew | 430/2 |

FOREIGN PATENT DOCUMENTS

| | | |
|---|---|---|
| 0421181 | 4/1991 | European Pat. Off. ............... 359/1 |
| 41 40 545 A1 | 4/1993 | Germany . |
| 5046064 | 2/1993 | Japan . |
| 5046065 | 2/1993 | Japan . |
| 93/00224 | 1/1993 | WIPO . |

OTHER PUBLICATIONS

Cowan, James J., "Blazed holographic gratings . . . " SPIE vol. 240 pp. 5–12, 1980.
ASM Engineered Materials Handbook, citations for Knoop hardness and Vickers hardness, Nov. 1995.
Marti, J.L. and Lanza, G.P.; "Hardness of Sulfamate Nickel Deposits", Plating, Apr. 1969. (copy not included).
Smith, Howard M.; "Principles of Holography", John Wiley & Sons, Inc., 1969; p. 49.

*Primary Examiner*—Martin Angebranndt
*Attorney, Agent, or Firm*—St. Onge Steward Johnston & Reens LLC

[57] ABSTRACT

Surface relief holograms are prepared by directly impressing them into aluminum and other hard metal substrates, without the need to preheat or otherwise soften the substrate. A holographic embossing shim is prepared from a master and possesses a unique combination of surface configuration, hardness, and strength. The embossing shim can be mounted on a cylindrical support. In one embodiment, the shim is used to emboss a hardenable material, which is later hardened to form a tool.

9 Claims, 1 Drawing Sheet

METHOD FOR EMBOSSING HOLOGRAMS INTO ALUMINUM AND OTHER HARD SUBSTRATES

TECHNICAL FIELD

The invention relates to improvements in production of holograms in hard substrates, including metals such as aluminum.

Commercially, holograms have been relied upon in a variety of applications, including decoration and security. Security uses include credit cards, document verification, product authentication and the like, to prevent counterfeiting, unauthorized reproduction, boot legging and pirating.

Holograms for both security and decorative purposes have been restricted to relatively high-cost articles, and have generally required preparation as an item separate from the article intended to bear it. The usual practice is to form the hologram on a soft plastic substrate, metalize the plastic, and adhesively attach it to a tag or the intended article. Many substrates, such as metal, present technical difficulties to the direct formation of holograms.

There is a need for a practical method to emboss a hologram directly into metal (e.g., aluminum) and other hard substrates.

BACKGROUND ART

Techniques for making a master hologram or diffraction grating from which replicas—of metallized plastic—can be mass-produced are known. As used herein, the term "hologram" is meant to include diffraction gratings. Briefly and very generally, there exist two distinct types of holograms and two basic techniques for producing them for use as masters. For the purposes of this description, the term "hologram" will be used to refer to any suitable pattern (either surface relief, or volume), or replica thereof, regardless of whether light diffracted from it reconstructs an image of a recognizable object or some other desired light distribution at wavelengths within and outside of the visible spectrum. As a practical matter, a master is formed and used to make multiple copies. Again, there are several procedures for making copies.

"Surface relief" holograms are different from "volume" holograms in the structure that provides the holographic image. Surface holograms employ a pattern of lands and grooves at the surface to the physical substrate. On the other hand, a volume hologram functions by diffracting light from internal layers, or fringes of varying contrast or refractive index.

One type of hologram is a white-light viewable, reflecting transmission hologram or rainbow hologram. This type of hologram can be a true, three dimensional hologram, which reproduces the three dimensional image of an object and is typically produced using coherent laser light and photosensitive plates. The light pattern of the original object can be reconstructed from such a hologram by diffraction of a portion of illuminating light, provided that the illuminating light impinges upon the hologram at the correct incident angle and is comprised of the correct wavelength or wavelengths.

The other type of hologram involves the production of a diffraction grating that does not necessarily represent an image of an object and can be effectively produced by the of use of coherent laser light interference, microphotolithographic techniques, or direct-write techniques, such as electron beam etching.

In one useful form of the first of these two techniques, a master hologram (H1) is formed by conventional techniques. This hologram is then projected out into space by playing it back with a conjugate to its original reference beam. This projected, real image is then made to interfere with another reference beam, and forms a holographic image (H2) that can be viewed in white light—no laser is necessary. The H1 is shot on a suitable photosensitive emulsion (e.g., silver halide). If shot on silver halide, the H1 master will have no surface structure—just micro light/dark bands that diffract light. The H2 is shot on photo-resist so that there is a reproducible holographic surface relief pattern.

E-beam mastering essentially "carves" out a series of geometric grooves in a surface. This can provide only two-dimensional (but highly kinetic) imagery. There is no "object" wavefront being recorded—just what is called a plane grating.

Once a master surface relief hologram is formed by one of these or other procedures, the surface relief pattern is typically converted to a physically more rugged structure from which replicas can be made. A first step in a usual commercial process is to form a thin layer of silver that conforms to the surface relief pattern. The purpose of the silver layer is to render the surface relief pattern electrically conductive to facilitate later electrodeposition of nickel in the exact physical shape of the pattern. From this metal master hologram, a number of submasters are usually made. Each submaster replicates the master surface relief pattern and is used to make a large number of copy holograms.

There are at least three basic procedures being utilized to make copy holograms. In each, a surface relief pattern of a hologram master or submaster is employed to copy the hologram onto a desired carrier, typically plastic. Of course, copies of the surface relief holograms are actually castings or forms, which exhibit an inverse surface structure of the master or a submaster.

One procedure for making copies involves embossing a thermoplastic film (hard embossing) wherein the submaster is urged against thin plastic film under sufficient heat and pressure to transfer the surface relief pattern into a surface of the film. This technique is referenced by H. M. Smith in Principles of HOLOGRAPHY, 1969, at page 49, and by D. J. Pizzanelli in WO 93/00224.

A second procedure (curable casting) employs a curable resin layer which is contacted directly or indirectly with a master to create the relief pattern and cured, such as by UV radiation, to set the pattern in permanent form. One process using this technique employs a casting process wherein a liquid resin is trapped between the surface relief pattern of a submaster and a plastic film while actinic radiation or other curing technique, such as electron beam irradiation, hardens the resin. When the submaster and film are separated, a cast surface relief pattern remains attached to the plastic film. This process is described, for example, by K. Y. Kwon in DE 41 40 545 and by S. P. McGrew in U.S. Pat. No. 4,758,296. A variation of this technique is taught by Takeuchi, et al., in U.S. Pat. No. 4,856,857, wherein a nontacky polymerizable precoat is shaped under heat and pressure and cured while in contact with the submaster. A further process utilizing a curable resin again utilizes a curable resin layer on a substrate, but utilizes a resin that can be worked at ambient temperature and is cured after separation from the submaster.

A third procedure (thermal casting) is similar to both of the others above, but utilizes heat to soften a thermoplastic web, or the surface of one, to forming temperature before contact with the master or submaster. The surface embossed with the relief pattern in this manner is cooled to harden the plastic surface. This technique is shown, for example, by the Krug reference cited above, D. R. Benoit, et al., in U.S. Pat. No. 5,164,227 and Dainippon in Japanese published applications Nos. 50 46064 and 50 46065.

A next step, in both the casting and the embossing replication processes, is to coat the surface relief pattern with a thin layer of opaque, reflective material—usually, aluminum applied by vacuum deposition. The result for any of these processes is a hologram in which the recorded light pattern is reconstructed in white light diffracted in reflection from the coated surface relief pattern. The reflective hologram replica can then be attached by lamination or otherwise to a substrate, such as an aluminum can. There is no practical method known for directly forming the hologram onto a metallic surface without degrading the character of the metal substrate, or the optical fidelity of the holographic submaster.

Two recent patents have been identified which describe the formation of holograms directly onto metal substrates, such as aluminum; however, both are subject to practical limitations. One process cannot be utilized without heating and degrading the metal substrate. The other requires specific stamping equipment.

In U.S. Pat. No. 4,725,111, Weitzen, et al., describe a process that, unlike the art prior to them, e.g., thermal casting on metal, does not require softening the metal to the point of plasticity. They note that the yield strength of annealed aluminum decreases steeply with rising temperature. What they disclose is that there is an optimum operating temperature for embossing that is at a temperature which is at the high end of a steeply declining yield strength versus temperature curve. Thus, inherently, although the disclosed process is meant to limit degradation of yield strength, there is some degradation. And, unfortunately, surface deformation increases when heating lowers the yield strength. This can cause unacceptably "wrinkled" cans due to the embossing pressures used. The disclosure reveals no special techniques to aid in preparing the hologram master or an embossing shim that would assure high quality and durability. Simply, the skilled worker is told that conventional techniques (the same used to emboss softened plastic) are all that are needed. Applicants' experience shows that unheated aluminum substrates cannot be embossed with holograms using old techniques, and they have endeavored to identify the changes necessary to enable this result. There is a need to enable providing a means and method for embossing a large number of aluminum substrates without compromising quality of the microstructure or integrity the tool.

In U.S. Pat. No. 5,193,014, Takenouchi, et al., describe a coining procedure for imparting a hologram to an aluminum container. The disclosure describes the use of a thin metal plate mold having a concave-convex hologram or diffraction pattern. It is said to be preferred to make the plate as thin as possible to render it deformable. This is necessary in the preferred embodiment wherein the plate mold is supported on a cushioning member. Unfortunately, when the plate is deformable and constantly subjected to deformation, the pattern on the plate tends to become distorted due to stretching forces. Moreover, bending stresses are concentrated at the grooves in the plate, and permitting freedom to flex increases the likelihood of stress failure.

Again, in the description of Takenouchi, et al., as in the disclosure of Weitzen, et al., the preparation of the metal plate mold is not described in detail, other than to indicate that it is done as conventional. The use of a cushioning member and a flexible substrate indicates that an unhardened nickel bath is employed because a hardened surface would further increase the likelihood of stress fracture. The softness of conventional nickel plating and the cushioned backing will tend to cause diminishing results in terms of image clarity over shorter than desired number of embossing cycles.

The problems addressed for coining, either with the disclosed flat or spherically-rounded surfaces, do not translate well to cylindrical surfaces. The ability to use cylindrical shims and achieve high production rates and long production runs is beyond the scope of the Takenouchi, et al., teachings. Cylindrical embossing shims will not provide durability and will break, stretch or deform unless design considerations not addressed by that reference are taken into account. That patent illustrates a cylindrical shim in FIG. 5, but the disclosure does not provide any reference to it other than in the description of the drawings. The factors necessary to assure success using cylindrical shims are not addressed. Indeed, there is no disclosure as to how one can be made.

It would be desirable to have a means and a method for reliably embossing aluminum (and other metals and hard materials) which would be effective over long production runs to provide high quality transfers that do not materially reduce the strength of the aluminum substrate.

BRIEF DESCRIPTION OF THE DRAWINGS

The invention will be better understood and its advantages will become more apparent from the following detailed description, especially when read in light of the accompanying drawings, wherein.

DISCLOSURE OF THE INVENTION

Figure 1:
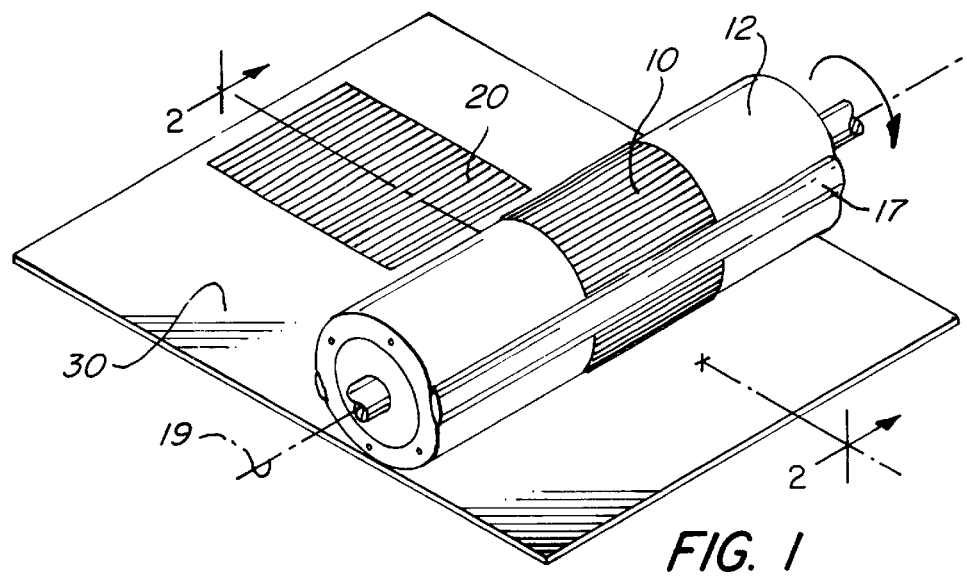
FIG. 1 is a perspective view of an embodiment of the invention, wherein an embossing shim is employed to directly impress a hologram into the surface of a flat aluminum article.

It is an object of the invention to provide an improved method for preparing an article made of a hard material (e.g., a metal such as aluminum) having an embossed hologram thereon.

It is another object of the invention to provide improved methods of preparing holographic embossing tools.

It is yet another object of the invention to provide improved holographic embossing tools.

It is another object of the invention to provide embossing tools for preparing holograms and methods for preparing and using such tools to emboss holograms into the surface of hard materials, such as aluminum.

It is yet another and still more specific object of the invention to provide both improved holographic embossing tools and methods of using them to the end that aluminum and other metals can be effectively embossed with holographic images with high definition over extended periods of commercial production.

It is still another, specific object of the invention to provide both improved holographic embossing tools and methods of using them for the high-volume, long-duration production of holographic images with high definition on unheated metal (aluminum) substrates.

It is another and more specific object of the invention to provide hardened-metal embossing tools, and in one embodiment provide such tools having curved shaping surfaces of hardened material such as hardened steel, or a softer material having a hardening outer coating or treatment.

These and other objects are accomplished by the present invention which provides methods for preparing articles of hard materials, such as aluminum, having embossed holograms thereon, methods of preparing holographic embossing tools and intermediate embossing tools (such as of unhardened steel, to be later hardened such as subjecting it to a surface hardening treatment, e.g., ion implantation, or a hard coating process such as amorphous carbon coating), holographic embossing shims having utility in such processes, intermediate and finished embossing tools in various shapes including cylindrical, and embossed articles.

The method of the invention, in one of its aspects, comprises: preparing a holographic embossing tool having a working surface thereon including a pattern of lands and grooves for embossing a hologram (this term including diffraction gratings), the ratio of the pitch of the lands and grooves to the depth of the grooves being less than 50:1; and hardening the working surface to provide a hardness of at least 450 on the Knoop scale, a tensile strength of at least 200–250 ksi, and a yield strength of at least 200 ksi. The tool will preferably have a thickness of greater than 200 µm, most preferably in the range of from 250 to about 500 µm in the case of curved shims.

The term "lands and grooves" as used herein is meant to describe a regular pattern of high and low areas which can, when illuminated, provide the desired image. It will be understood by those skilled in the art that the lands are not necessarily flat or squared, but in some types of holographic mastering, may be (e.g., when prepared by E-beam etching).

One preferred method of preparing an embossing shim according to the invention comprises: preparing a hologram film master (by exposing a photo resist film to an interfering light pattern and developing the film, electron beam etching or photolithographic techniques), plating the resulting film master with a silver coating, electroforming a layer of nickel onto the silver or nickel coating to form a negative master (e.g., a "silver master"); removing the negative master from the hologram film master and electroforming nickel onto the surface of the coating to form a positive reproduction of the negative master; and forming an embossing shim by then electroforming nickel in a hardening bath of composition and under conditions effective to produce a layer of nickel of enhanced hardness and durability.

An embossing tool as prepared by the above method is used to prepare an embossed article of aluminum or other hard material by: pressing the embossing tool against the surface of a hard (metal) substrate to transfer thereto the intended hologram. The substrate can be the final article or stock for it, e.g., of aluminum, or it can be an intermediate tool, such as of unhardened steel that is subjected to hardening following transfer.

In the case where an intermediate tool is to be formed, a hard (positive) shim is first formed from a negative master and transferred to the intermediate embossing tool, such that the tool imparts a final holographic image that is positive and orthoscopic.

Preferably, the ratio of pitch to depth is within the range of from 0.5:1 to 5:1, e.g., greater than 1:1 but less than 3:1. It is also preferred that the hardness of the of the electroplated nickel be sufficient to enable large production runs without undue wear or brittle failure and for curved embossing shims is most preferably from about 450 to about 500 as measured on the Knoop scale, or higher to the extent consistent with retention of structural integrity. It is also preferred that the pattern of lands and grooves exhibit a depth of at least 200 nanometers. In the case of flat tools or those formed on rigid metal bodies such as cylinders, the hardness of the surface will generally be well above 500 on this scale.

An improved holographic embossing tool of the invention comprises: a hardened nickel layer having, on a working surface thereof, a pattern of lands and grooves for embossing a hologram or diffraction grating; and, a supporting structure of steel supporting said layer from a side opposite to the working surface.

An intermediate embossing tool according to the invention is prepared by from an unhardened element (e.g., of a metal such as steel, or a suitable plastic, ceramic or the like), preferably in a form such as a cylinder that requires a smaller value of yield strength than a thinner image-imparting shim. For intermediate cylinder production, an image imparting shim can be optimized in terms of hardness and strength by making it of substantial thickness and holding it flat during contact with a cylindrical substrate for the intermediate tool. Therefore, it would not be subjected to as much deformation stress. Once the surface profile has been transferred to the relatively soft cylinder, the cylinder surface can be hardened. A particularly effective hardening can be achieved by impregnating the material near the surface with amorphous carbon. This coating can also act to amplify or exaggerate the pitch to depth ratio of the pattern of lands and grooves if applied so as to accumulate more on the crests than in the grooves of the surface structure. The final embossing tool is an intermediate tool as defined that has been hardened to a surface hardness of at least 450 on the Knoop scale (e.g., at least 500 and up to a level that does not make the structure too brittle for durability). It has been found that a high luster polish on the intermediate cylinder structure prior to receiving the image transfer, significantly enhances transfer efficiency.

Industrial Applicability

The invention will be described below with specific reference to an embodiment wherein a holographic embossing shim 10 of the invention is employed to emboss a holographic image 20 on an unheated aluminum substrate 30, e.g., aluminum can lid stock. This description is for the sake of simplicity and clarity. It will be understood, however, that one preferred application will be preformed, lidless aluminum cans of the type used for soda and beer. It will also be pointed out how a shim of this type is used to impress the hologram into a tool substrate to form a embossing tool. While the invention surprisingly embosses aluminum with good tool durability (e.g., at least 100,000 cycles of embossing, and preferably at least 200,000 cycles) and image quality, it is intended to include all hard materials of suitable malleability (e.g., characterized by the inherent ability to be deformed plastically with a suitably hard embossing tool), including unhardened steel.

Figure 2:
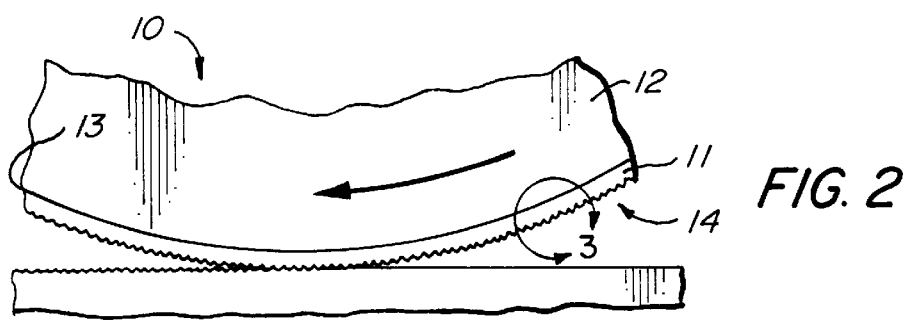
FIG. 2 is a cross-sectional view, partially broken away, taken along plane 2—2 in FIG. 1.
Figure 3:
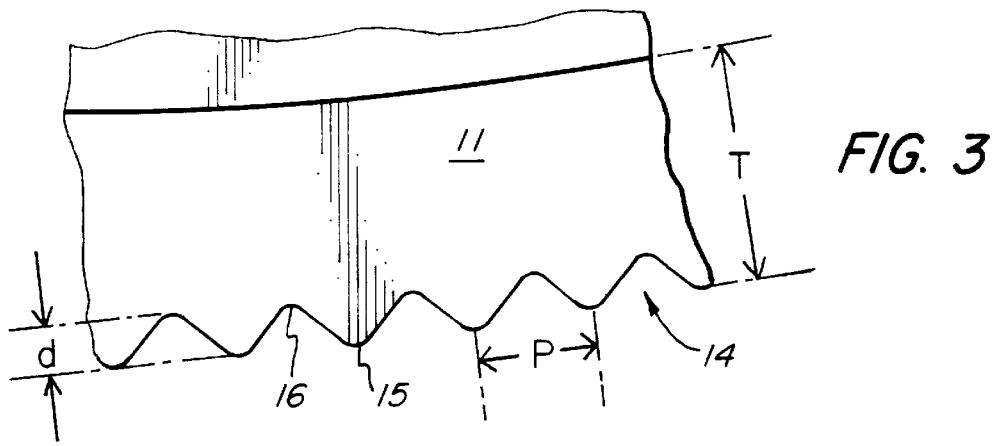
FIG. 3 is an enlarged view of the cutaway section encircled with the dot-dashed line 3 in FIG. 2.

A shim 10 of this type is shown in FIG. 2 to comprise a hardened nickel layer 11 and a supporting structure of steel 12 (shown as a cylinder) supporting the nickel layer from a side 13 opposite to the working surface. The use of nickel is discussed throughout, but it will be recognized that other metals can be electroformed to achieve surfaces of similar properties. The nickel layer is shown better in FIG. 3 to have a working surface 14 thereon composed of a pattern (constituting the reverse of the holographic image 20) of lands 15 and grooves 16. The shim is clamped as securely as possible to the support, such as by clamps 17. The surface 13 preferably has at least one ridge or other surface irregularity to mate with complimentary means on the supporting structure to form a mechanical interlock, assuring accurate registry.

The pattern of lands and grooves preferably exhibits at least a minimum depth d of from at least 200, e.g., greater than 300 nanometers, (nm), a pitch p of from about 0.5 to about 5 micrometers ($\mu$m) and a ratio of pitch to depth of less than 50:1. These values are representative for light in the visible spectrum. For wavelengths outside this spectrum, they can be adjusted accordingly. For better transfer, the ratio will be less than 20:1, and will preferably be less than 10:1. Most preferably the depth d will be within the range of from about 500 nm to about 5000 nm, depending on whether or not increased groove depth adversely affects tool integrity.

Figure 4:
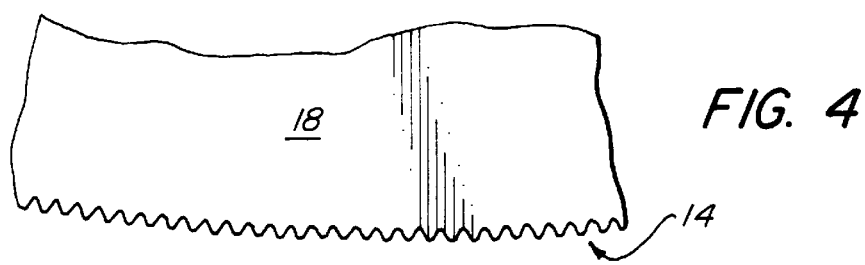
FIG. 4 is an embodiment wherein an embossing tool is formed of a material such as aluminum, the surface of which is impressed with a pattern of lands and grooves and then hardened to make it effective for embossing a hologram into a relatively hard material (e.g., aluminum).

FIG. 4 shows a variation on the above, wherein the working surface having the pattern 14 of lands and grooves is formed directly on a tool substrate 18. The tool substrate will be of a suitably hard material such as steel or other material capable of being hardened to the requirements of the invention. In this embodiment, a shim (e.g., like 10) is prepared and used as an intermediate tool to impress the pattern of lands and grooves into the surface of a cylinder (or other suitable working shape). The surface of the tool substrate is preferably slightly convex to the extent necessary to compensate for bending of the substrate support or is comprised of such a geometric shape so as to compensate for distortion other than simple deflection. The surface of the tool can be hardened following transfer of the pattern. Hardening can be done chemically, thermally, or other known method, but is preferably achieved by amorphous carbon hard coating. The intermediate tool can be of any suitable substrate material, e.g., metal such as steel, or of a suitable ceramic, composite, or plastic. The shim can be laid flat and can be of considerable thickness during contact with the intermediate tool substrate in this embodiment, thus enabling the shim to be of greater structural integrity.

The first steps in a preferred method for preparing a hologram, in terms of preparing the substrate on which a master will be formed and the arrangement of the holographic forming tools to achieve the desired pattern of lands and grooves, are accomplished in much the same manner as in the prior art, but with significant distinctions noted below and exemplified in detail later. The process of the invention can be employed to form a true, three-dimensional hologram as well as images known as diffraction gratings, or images comprised of selective recombinations of diffraction gratings or specific spatial and/or rotational orientations. Both types of images are included within the meaning of the term hologram. The techniques for forming such images are essentially the same and no distinction will be made between them in this description.

It is preferred in some cases to form a white-light viewable, reflecting transmission hologram. This type of hologram can be a true, three dimensional hologram, which reproduces the three dimensional image of an object and is typically produced using coherent laser light and photosensitive plates. The light pattern of the original object can be reconstructed from such a hologram by diffraction of a portion of illuminating light, provided that the illuminating light impinges upon the hologram at the correct incident angle and is comprised of the correct wavelength or wavelengths.

To achieve this result, a master hologram (H1) is formed by conventional holographic techniques using a reference laser beam and a reflected objectbeam. After processing, this hologram is then projected out into space by playing it back with a conjugate to its original reference beam. This projected, real image is then made to interfere with another reference beam, and forms a holographic image (H2) that can be viewed in white light—no laser is necessary. The H1 is shot on a light-sensitive emulsion (e.g., silver halide) which when developed has no surface structure—just micro light/dark bands that diffract light. The H2 is shot on photo-resist so that there is a reproducible holographic surface relief pattern. The pattern is captured in the photo resist layer and is revealed upon development and illumination. The result is a striking and three-dimensional reproduction of the image of the object, in the case where a three dimensional object is used.

In the case of diffraction gratings, the pattern is not necessarily formed to represent a particular object, but can be generated by electron beam or photolithographic techniques as well as the (standard) interference of two coherent light beams which, when developed, can provide an interesting three-dimensional appearance under illumination. Also, these patterns can, in certain mastering schemes, be produced by direct write or in a single step; effectively removing the H-1 process and using only the H-2 plate. The invention utilizes the discovery that several factors can be controlled to enable the preparation of embossing tools that can be successfully employed to make holograms (whether of the conventional type first mentioned or the diffraction grating type, the term hologram not being meant to distinguish between them) by embossing aluminum and other metal substrates.

In the first step of a preferred process, a photoresist layer is exposed to an interfering light pattern. The interfering light pattern can be for the purpose of forming a hologram or a diffraction grating. The photo resist is itself conventional, and can be of any of a number of commercial types available for holographic purposes, such as Shipley 1400 or 1800 series, commercially available. These resists are typically 1–2 micrometers ($\mu$m) in thickness. The interfering light pattern is projected onto the resist to achieve a desired pitch of from about 0.5 to about 5.0 $\mu$m, and preferably from about 0.5 to about 3 $\mu$m. This is varied as desired by setting up the holographic table (a bed highly-stabilized against movement such as by vibration) to provide a suitable angle of incidence between the reference beam of light and the object beam in the case of conventional holograms. The pitch is a function of the wave length $\lambda$ of the light and the angle of incidence $\Theta$ (the angle between the line of the reference beam and a line normal to the plane of the film) as known from the relation $\lambda = p \sin \Theta$ and adjustment of angle $\Theta$ thus permits varying the pitch, which as described above is the distance between the lands in the final physical shim surface.

The depth d of the grooves is important to achieve the necessary definition in the final embossed article. The depth can have an effect on the strength of the embossing shim because stress tends to concentrate in the grooves, proportionally with their depth. This is less of a factor where the cylindrical tool is formed as opposed to the shim. For shims of suitable hardness, the stresses caused by the pressure of transfer are great and it is necessary to utilize the correct depth of grooves with the correct hardness and strength characteristics of the shim material. Preferably, the depth d will be at least 200 nanometers (nm), typically being within the range of from 250 to 1500 nm, depending upon the type of tool used. Experience will show the worker that to some degree thinner tools will require shallower grooves.

The depth can be varied in a number of ways, such as by varying exposure time for given development conditions or by varying development time and/or temperature for given exposure times. The techniques for accomplishing this are known, but what was not known heretofore is that by judicious selection of the correct pitch and depth of the pattern of lands, it is possible to vary the force applied by individual lands on the shim to the aluminum substrate being embossed. It is preferred according to the invention that the ratio of pitch to depth p/d be at least 10:1, and preferably within the range of from about 0.5:1 to about 5:1.

The resulting pattern (e.g., sinusoidal or other repeating on nonrepeating) of lands and grooves on the embossing tool, when prepared in the preferred manner, present smaller, more knife-like leading edges (see 15 in FIG. 2) capable, of penetrating the aluminum more easily to provide a more efficient transfer of the surface profile. Unlike embossing on softened materials such as plastic, the tools of the invention have been designed to be able to penetrate into an aluminum product substrate less than the entire depth of the grooves but still provide excellent diffraction efficiency. The invention is equally capable of improving the formation of holograms on other metals (e.g., gold, copper, silver, and the like) and hard plastics, etc.

Following development of the photoresist layer, the developed holographic master is then plated with a silver coating in conventional fashion to make it electrically conductive. The silver-plated, developed master is then subjected to electroforming in conventional fashion, typically in a nickel bath of conventional composition and at conventional current densities. Once the layer of nickel reaches a thickness of from about 375 to about 500 μm, the formation of what is called a negative master (e.g., a "silver master") is complete. The negative master is removed from the developed photo resist (hologram "glass" master), preferably treated with a release layer and again subjected to electroforming to apply a layer of nickel (of a thickness of from about 375 to about 500 μm) onto the silver surface to form a positive reproduction of the silver master.

The next step in forming an embossing shim 10 shown in FIG. 1 is electroforming nickel in a hardening bath of composition and under conditions effective to produce a layer of nickel of enhanced hardness and durability. It is also preferred that the hardness of the electroplated nickel be sufficient to enable large production runs without undue wear or brittle failure. It is preferred that the hardness of the of the electroplated nickel be sufficient to enable production of several tools without undue wear or brittle failure and is at least about 450 to 500 as measured on the Knoop hardness scale. For thin shims that are to be bent about a curved support, it is important for best results for the shim to have controlled hardness, preferably less than about 600 on the Knoop scale, and high strength, characterized by a tensile strength of about 200–250 ksi, and a yield strength of at least 200 ksi. For shims that are held flat during use, the hardness can be as high as possible because fracturing due to bending is not an issue.

The nickel bath can be a typical nickel sulfamate bath, such as Barret SNR, at the recommended concentration and current density. A hardener, such as Barret hardening agent SNHA at about 1.5 ounces per gallon, boric acid as needed to maintain a pH of about 4 (depending on the chemicals) and a wetting agent as needed, is employed to give the requisite hardness and strength to the working surface 14 of the shim. For a more complete discussion of suitable plating techniques to obtain the correct balance of hardness and ductility, see J. L. Marti and G. P. Lanza, "Hardness of Sulfamate Nickel Deposits", PLATING, April 1969, which is incorporated herein by reference in its entirety. A suitable bath temperature will be within the range of from about 110 to about 120° F., again depending on the chemistry of the bath, with light to medium agitation and no air injection. The shim will preferably have a thickness of greater than 200 μm and most preferably in the range of from 250 to about 500 μm, e.g., from about 250 to about 375 μm. In a preferred form of a shim backed on a cylindrical surface (e.g., of from 5 to 60 cm in diameter), the thickness, hardness and strength of the shim are important factors.

Shims too soft (<400 Knoop) or too weak (< about 200 ksi) can deform or break. Thin, curved shims that are too hard (> about 600 Knoop) can crack. And, shims being made soft to avoid these and other problems will not last for any practical number of cycles. The side 16 opposite from the working surface can be affixed to a backing structure of suitable material such as steel 11 (or a multi-layered material) to suitably support to the shim during embossing. The backing structure can be in the form of a rotary embossing wheel, but other shapes such as elliptical, arcuate and planar can also be employed.

An aluminum product substrate, such as the type of stock normally employed for making aluminum cans, drawn or otherwise formed, will typically be of from 75 to 150 μm in thickness and can be supported upon a solid backing (e.g., steel) during embossing. Aluminum of this type (e.g., 3004 H19 alloy) is typically characterized as having a 37–40 KSI yield strength. The embossing shim is pressed against the surface of an aluminum substrate to transfer the intended hologram to it. Pressures of from about the yield strength of the substrate to no more than about 1.5 times that value are typical, it being understood that for rotary embossing, contact is tangential to the surface and along a line parallel to the axis of rotation 19 of the rotary member.

A shim employing the embossing layer can be employed to directly emboss a metal surface to form a final copy. It can be employed to form an intermediate embossing tool of an unhardened, but hardenable metal element, preferably a cylinder, which can then be hardened to form a final embossing tool having a surface hardness of about 200 to 300 kg/mm$^2$ on the Vickers scale or more in the case of tool steel and from about 1,000 to about 5,000 kg/mm$^2$ in the case of shims or cylinders hardened by amorphous diamond deposition. A useful hardenable metal is type D2 tool steel. Also suitable would be any metal capable of being hardened by ion implantation or diamond deposition, e.g., amorphous diamond deposition as described, for example, in U.S. Pat. Nos. 5,478,650 and 5,266,409 and the references cited therein. A commercial process of this type is available from Diamonex, Allentown, Pa. as DLC Amorphous Diamond. The coating can have a thickness of from about 300 to about 500 Å.

The following example is provided to further explain and illustrate the invention and some of its advantages, but are not to be taken as limiting in any regard. Unless otherwise indicated, all percentages are by weight.

EXAMPLE

This example describes the preparation of an embossing shim according to the invention and employing it to emboss an open-ended aluminum can as the substrate.

A table is suspended to isolate it from vibrational movement, and is configured with a laser ($\lambda$ of 456 nanometers) and suitable lenses and mirrors to split the laser light into two beams—one, a reference beam, and the other an object beam which is directed toward an object and then to a photographic film having a photo resist layer sensitive to the light of the laser. The angle of incidence (angle of the reference beam to the plane of the film) is 30°. The photoresist film is exposed to the interfering light pattern caused by the convergence of the two beams at the film and developed in a dilute sodium hydroxide bath as recommended by the manufacturer, followed by a deionized water rinse and $N_2$ drying.

The resulting film master is then plated with silver by a silver reduction process to make the film master electroconductive and capable electroforming to build up a layer of nickel to form a "silver" (negative) master. The silver master is separated from the hologram master, and after coating with a release layer of potassium dichromate a layer of nickel is electroformed onto the silver surface to form a positive reproduction of the silver master. The positive reproduction is also coated with a release layer of potassium dichromate, and subjected to electroforming to produce a soft negative, which is used to grow a hardened nickel shim. Electroforming for the hardened shim is conducted in a hardening bath of Barret SNR nickel sulfamate, at the recommended concentration of from about 10 to about 15 ounces per gallon, with the current density of from about 10 amps per square decimeter at 110 to 120° F. As a hardener, Barret hardening agent SNHA is employed at about 1.5 ounces per gallon, boric acid as needed to maintain a pH of about 4 (depending on the chemicals). Also, a wetting agent is employed as needed to prevent the shim surface from becoming pitted or porous. The bath is subjected to light to medium agitation and no air injection. The hardened nickel layer is about 400 $\mu$m in thickness. The nickel layer is then attached to a steel cylinder of 26.4 centimeters diameter to form an embossing tool.

The embossing tool is then pressed against the surface of an aluminum substrate (characterized as an ironed, topless aluminum can, such as of 3004 aluminum alloy) in a rolling motion at 20 rpm and a contact pressure sufficient to transfer the intended hologram with a transfer completeness of at least about 80–85%, preferably at least 85–90%.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

What is claimed is:

1. A method for preparing an aluminum article having an embossed hologram thereon, comprising:
   preparing a surface-relief holographic master by exposing a photo resist layer to an interfering light pattern and developing;
   electroforming a layer of metal onto the holographic master to prepare a negative master;
   removing the negative master from the holographic master and electroforming metal onto the negative master surface to form a positive reproduction of the negative master;
   forming an embossing shim by then electroforming nickel in a hardening bath of composition and under conditions effective to produce a layer of nickel of enhanced hardness and durability; and
   pressing the embossing shim against the surface of an unheated aluminum can or can stock substrate to transfer thereto the intended hologram.

2. A method according to claim 1, wherein the interfering light pattern is formed from two beams of coherent light for producing a hologram to reproduce the light image of a three dimensional object, the hardness of the nickel layer on the embossing shim is at least about 450 on the Knoop hardness scale and is sufficient to enable large production runs without undue wear, plastic deformation or brittle failure, the exposure and developing are effective to a degree necessary to create a pattern of lands and grooves having at least a minimum depth of from about 100 to about 1500 nanometers and a ratio of pitch to depth within the range of from about 0.5:1 to about 5:1.

3. A method according to claim 1, wherein the interfering light pattern is formed from two beams of coherent light for producing a hologram to reproduce the light image of a three dimensional object.

4. A method according to claim 1, wherein the interfering light pattern is formed from two beams which are focused to a superposed and concentric pattern.

5. A method according to claim 1, wherein the hardness of the nickel layer on the embossing shim is sufficient to enable large production runs without undue wear, plastic deformation or brittle failure of the shim.

6. A method for preparing an aluminum article having an embossed hologram thereon, comprising:
   preparing a surface-relief holographic master by exposing a photo resist layer and developing;
   electroforming a layer of metal onto the holographic master to prepare a negative master;
   removing the negative master from the holographic master and electroforming metal onto the negative master surface to form a positive reproduction of the negative master;
   forming an embossing shim by then electroforming nickel in a hardening bath of composition and under conditions effective to produce a layer of nickel of enhanced hardness and durability; and
   pressing the embossing shim against the surface of an unheated aluminum substrate to transfer thereto the intended hologram.

7. A method according to claim 6, wherein the interfering light pattern is formed from two beams of coherent light for producing a hologram to reproduce the light image of a three dimensional object, the hardness of the nickel layer on the embossing shim is at least about 450 on the Knoop hardness scale and is sufficient to enable large production runs without undue wear, plastic deformation or brittle failure, the exposure and developing are effective to a degree necessary to create a pattern of lands and grooves having at least a minimum depth of from about 100 to about 1500 nanometers and a ratio of pitch to depth within the range of from about 0.5:1 to about 5:1.

8. A method according to claim 6, wherein the interfering light pattern is formed from two beams of coherent light for producing a hologram to reproduce the light image of a three dimensional object.

9. A method according to claim 6, wherein the hardness of the nickel layer on the embossing shim is sufficient to enable large production runs without undue wear, plastic deformation or brittle failure of the shim.

* * * * *

UNITED STATES PATENT AND TRADEMARK OFFICE
CERTIFICATE OF CORRECTION

PATENT NO. : 6,017,657
DATED : January 25, 2000
INVENTOR(S) : Mentz, Dolan et al It is certified that error appears in the above-identified patent and that said Letters Patent is hereby corrected as shown below:

<u>Title page,</u>
Item [75], Inventors, add the following:
-- Thomas L. Levendusky, Greensburg, PA; Simon Sheu, Murrysville, PA; Robert B. Larsen, Maryville, TN; Mark W. Schaefer, Knoxville, TN; Neville C. Whittle, Irwin, PA. --

Signed and Sealed this

Fifth Day of October, 2004

JON W. DUDAS
*Director of the United States Patent and Trademark Office*